Figure 1:
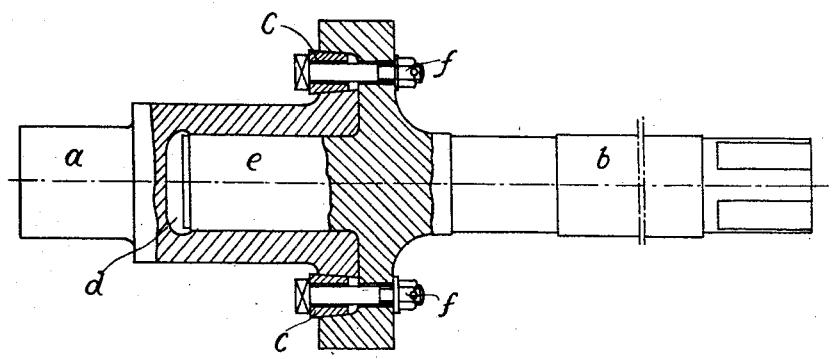

M. SCHNEIDER.
ADJUSTABLE COUPLING FOR ROLLING MILLS.
APPLICATION FILED MAR. 22, 1921.

1,412,317.

Patented Apr. 11, 1922.

Inventor.
Max Schneider,
By Watson, Cait, Morse & Grindle,
Attorneys.

UNITED STATES PATENT OFFICE.

MAX SCHNEIDER, OF BISMARCKHÜTTE, GERMANY.

ADJUSTABLE COUPLING FOR ROLLING MILLS.

1,412,317.  Specification of Letters Patent.  Patented Apr. 11, 1922.

Application filed March 22, 1921. Serial No. 454,544.

*To all whom it may concern:*

Be it known that I, MAX SCHNEIDER, a citizen of Germany, and resident of Bismarckhütte, Upper Silesia, Germany, have invented certain new and useful Improvements in Adjustable Couplings for Rolling Mills, of which the following is a specification.

This invention relates to swaging mills, such as those operating on the graduated feed or step-by-step rolling principle, in which coincidence of certain points on the circumference of the rolls must be ensured.

Heretofore this has only been possible by using great care in keying the rolls in the correct position, especially when multiple dog couplings are employed for the spindles of the rolls or gear wheels. Moreover, this difficulty is increased if the spindles of the rolls or gear wheels are subjected to varying torsional stresses, which is not uncommon. There is also difficulty in milling the dogs of the teeth on new spindles when it is necessary to supply new parts to accurately fit the old coupling member.

According to the present invention an adjustable coupling is employed, the two parts of which are adjustably clamped together by segmental clamping pieces, the arrangement being such that the two parts are angularly adjustable in relation to each other and can be secured in any relative angular position.

One constructional example of the improved coupling is illustrated in the drawings.

Figure 2:
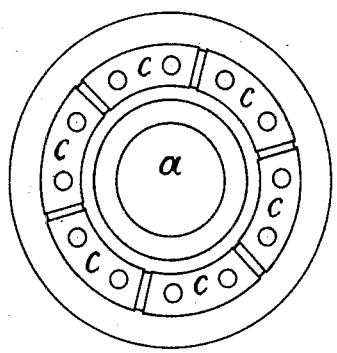

Fig. 1 is a longitudinal section, and
Fig. 2 a front view thereof.

The spindle consists of the two parts $a$ and $b$, the part $b$ having a journal $e$ which projects into a recess $d$ in the part $a$.

In order to ensure constant co-axial relation, the parts $a$ and $b$ are connected together by segmental clamping pieces $c$ which are tightened up by bolts $f$. If a roll or gear wheel is to be changed and if it is then found that the corresponding points on the rolls do not exactly coincide, the segments $c$ may be slackened, by slacking the bolts $f$, and exact adjustment of the rolls effected by relative rotation of the parts, the bolts $f$ being thereupon tightened up again. The same method may be adopted if torsional stresses are set up during the working of the rolling mill.

The wedging action of the segmental clamping pieces and the tension in the bolts $f$ can be readily made sufficient to prevent relative angular movement of the parts $a$ and $b$ and thus constant and proper working of the rolls is ensured.

Claims—

1. An adjustable coupling for the spindles of rolling mills comprising a pair of co-axial shaft members, a collar on one of the members forming an annular recess surrounding the other member and adjustable clamping segments in said recess.

2. An adjustable coupling for the spindles of rolling mills comprising a female shaft member having an axial hollow bearing, a male shaft member having a journal adapted to fit said bearing, a collar on said male shaft member recessed to form a tapering annular recess around the female shaft member, a plurality of tapering segments in said recess and means for adjustably securing said segments in position.

MAX SCHNEIDER.